United States Patent
Gilliam

(10) Patent No.: US 11,277,375 B1
(45) Date of Patent: Mar. 15, 2022

(54) SENDER POLICY FRAMEWORK (SPF) CONFIGURATION VALIDATOR AND SECURITY EXAMINATOR

(71) Applicant: Saudi Arabian Oil Company, Dhahran (SA)

(72) Inventor: Michael Bradford Gilliam, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/140,231

(22) Filed: Jan. 4, 2021

(51) Int. Cl.
| | |
|---|---|
| *G06F 15/16* | (2006.01) |
| *H04L 61/4511* | (2022.01) |
| *H04L 51/48* | (2022.01) |
| *H04L 61/4552* | (2022.01) |

(52) U.S. Cl.
CPC .......... *H04L 61/1511* (2013.01); *H04L 51/28* (2013.01); *H04L 61/1552* (2013.01)

(58) Field of Classification Search
CPC . H04L 61/1511; H04L 51/28; H04L 61/1552; H04L 63/145; H04L 63/1433; H04L 29/12066
See application file for complete search history.

(56) References Cited

U.S. PATENT DOCUMENTS

| | | | |
|---|---|---|---|
| 7,996,475 B2 | 8/2011 | Drako et al. | |
| 8,667,583 B2 | 3/2014 | Polyakov et al. | |
| 9,092,616 B2 | 7/2015 | Kumar et al. | |
| 10,447,633 B2 * | 10/2019 | Gupta | H04L 51/12 |
| 10,715,475 B2 | 7/2020 | Richards et al. | |
| 10,715,543 B2 | 7/2020 | Jakobsson | |
| 10,904,012 B1 * | 1/2021 | Duncan | H04L 63/101 |
| 2005/0022008 A1 * | 1/2005 | Goodman | G06Q 10/107 726/4 |
| 2008/0189770 A1 * | 8/2008 | Sachtjen | H04L 9/12 726/4 |
| 2015/0213131 A1 * | 7/2015 | Styler | G06Q 10/107 707/767 |

(Continued)

FOREIGN PATENT DOCUMENTS

| | | |
|---|---|---|
| EP | 3317802 | 5/2019 |
| JP | 5327757 | 10/2013 |

*Primary Examiner* — Umar Cheema
*Assistant Examiner* — Tesfu N Mekonen
(74) *Attorney, Agent, or Firm* — Fish & Richardson P.C.

(57) ABSTRACT

Systems and methods include a computer-implemented method for validating domains and Sender Policy Framework (SPF) configurations. A relevant domain name for a domain in the set of domains is accessed through a domain comma-separated value (CSV) file. An invalid domain name not adhering to CSV format specifications is identified. Any domains without a valid domain name system (DNS) text record are determined. Domains having insufficient SPF configuration mechanisms are determined. Domains having insufficient SPF configuration qualifiers are determined. Domains having insufficient SPF configuration modifiers are determined. A determination is made whether the domain is valid and the SPF configuration is valid based on a domain name, the DNS text record, the mechanisms of the SPF configuration, the qualifiers of the SPF configuration, and the modifiers of the SPF configuration. A report of a set of SPF configurations corresponding to a set of domains is provided.

20 Claims, 4 Drawing Sheets

(56) References Cited

U.S. PATENT DOCUMENTS

| | | |
|---|---|---|
| 2016/0315969 A1* | 10/2016 | Goldstein ............ H04L 61/1511 |
| 2019/0379660 A1* | 12/2019 | Thirumavalavan ........................... H04W 12/084 |
| 2020/0177552 A1 | 6/2020 | Moms et al. |
| 2020/0296082 A1* | 9/2020 | Killoran, Jr. ............ H04L 63/08 |

* cited by examiner

SENDER POLICY FRAMEWORK (SPF) CONFIGURATION VALIDATOR AND SECURITY EXAMINATOR

BACKGROUND

The present disclosure applies to validating domain names and corresponding Sender Policy Framework (SPF) configurations. If a message is sent from a domain identified using a domain name system (DNS) server, and the domain is identified as being invalid, then an email server can be configured to discard the message. This can help to minimize, for example, potentially dangerous spoofed messages.

SUMMARY

The present disclosure describes techniques that can be used for validating domains and Sender Policy Framework (SPF) configurations. In some implementations, a computer-implemented method includes the following. A set of SPF configurations corresponding to a set of domains are validated. A relevant domain name for a domain in the set of domains is accessed through a domain comma-separated value (CSV) file. A valid domain name is identified, or an invalid domain name not adhering to CSV format specifications is identified. A corresponding domain name system (DNS) text record is accessed using the valid domain name, and any domains without a valid DNS text record are determined. Mechanisms of an SPF configuration for the valid domain name are analyzed, and domains having insufficient SPF configuration mechanisms are determined. Qualifiers of the SPF configuration for the valid domain name are analyzed, and domains having insufficient SPF configuration qualifiers are determined. Modifiers of the SPF configuration for the valid domain name are analyzed, and domains having insufficient SPF configuration modifiers are determined. A determination is made whether the domain is valid and the SPF configuration is valid based on a domain name, the DNS text record, the mechanisms of the SPF configuration, the qualifiers of the SPF configuration, and the modifiers of the SPF configuration. A report of a set of Sender Policy Framework (SPF) configurations corresponding to a set of domains is provided.

The previously described implementation is implementable using a computer-implemented method; a non-transitory, computer-readable medium storing computer-readable instructions to perform the computer-implemented method; and a computer-implemented system including a computer memory interoperably coupled with a hardware processor configured to perform the computer-implemented method/the instructions stored on the non-transitory, computer-readable medium.

The subject matter described in this specification can be implemented in particular implementations, so as to realize one or more of the following advantages. First, the techniques of the present disclosure can be used to handle numerous Simple Mail Transfer Protocol (SMTP) configurations, including potentially problematic ones, which exist for handling email messages. Second, the number of illegitimate messages can be minimized by ensuring that a sender is permitted to send messages. Third, the occurrences of potentially dangerous harmful cyber email messages can be reduced. Fourth, domains having enforceable SPF settings can be efficiently and accurately identified by examining and evaluating the SPF configurations, without needing to constantly adjust SPF settings.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

DESCRIPTION OF DRAWINGS

Like reference numbers and designations in the various drawings indicate like elements.

DETAILED DESCRIPTION

The following detailed description describes techniques for ensure the validity of electronic messages received by validating Sender Policy Framework (SPF) configurations.

Various modifications, alterations, and permutations of the disclosed implementations can be made and will be readily apparent to those of ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

The implementation of the safety mechanism requires a fast and accurate method of determining the validity and effectiveness of SPF configurations to ensure legitimate messages are not accidentally blocked. A report is created and delivered that is used for safely implementing SPF mechanisms on the email server.

Figure 1:
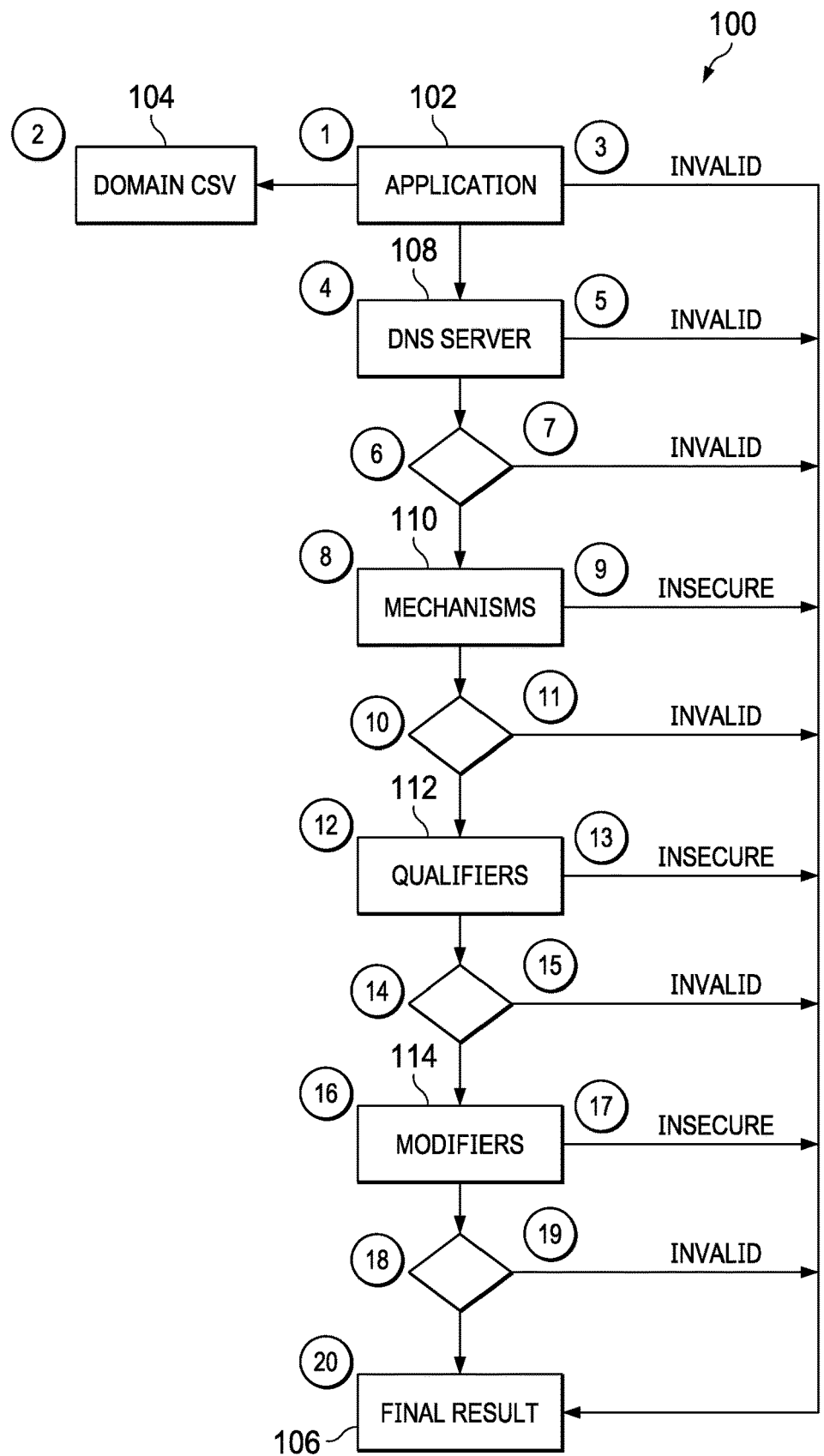
FIG. 1 is a flow diagram of an example of a workflow for validating Sender Policy Framework (SPF) configurations, according to some implementations of the present disclosure.

FIG. 1 is a flow diagram of an example of a workflow 100 for validating SPF configurations, according to some implementations of the present disclosure.

At step 1, an application 102 is started. At step 2, the application accesses relevant domain names contained within a domain CSV file 104. A domain name, for example, is a unique name used to differentiate a computer or a group of computers on the internet. A domain name system (DNS) is a system that correlates an Internet Protocol (IP) address to a name, and the reverse. At step 3, information that indicates that a domain name does not adhere to CSV format specifications is sent by the application 102 to a final report 106.

At step 4, valid domains are sent by the application 102 to a DNS server 108, requesting a DNS text (TXT) record. A TXT record lists the mail servers that can send email for a domain. A TXT record is a type of resource record in the DNS that is systematically used to provide the ability to associate arbitrary text with a host name or other name, such as human readable information about a server, network, data center, or other accounting information. The host name can be the first portion of a Fully Qualified Domain Name (FQDN).

At step 5, domains without a valid DNS record are indicated in the final report 106. At step 6, the text record for the domain is requested. At step 7, the final report 106 is updated if the text record does not exist or does not contain a valid SPF.

At step 8, mechanisms 110 for the SPF configuration is analyzed. Mechanisms can include SPF records that identify the servers that are permitted to send mail on behalf of the domain. At step 9, any SPF configuration that is considered insufficient is reflected in final report 106. At step 10, results of evaluating SPF mechanism are provided. At step 11, the final report 106 is updated with SPF invalidity information when the SPF mechanism is invalid.

At step 12, qualifiers 112 that are to be examined are extracted. Qualifiers describe an action to take when a sending IP matches the qualifier. At step 13, a mechanism configuration that is valid but does not provide enough protection (based on the qualifiers 112) is included in final report 106. At step 14, the outcome of the evaluation of the qualifiers 112 is created. At step 15, any invalid qualifiers 112 are included in the final report 106.

At step 16, the SPF modifiers 114 are examined. Modifiers can include name/value pairs (for example, separated by an equals sign) that provide additional information. Modifiers can appear at the end of the SPF record, for example. A modifier may not appear more than once, and unrecognized modifiers are ignored. At step 17, modifiers 114 that provide insufficient security are indicated in the final report 106. At step 18, evaluation of modifiers 114 occurs. At step 19, misconfigured modifiers 114 are reflected in the final report 106. At step 20, a final determination of the domain is sent to the final report 106.

Figure 2:
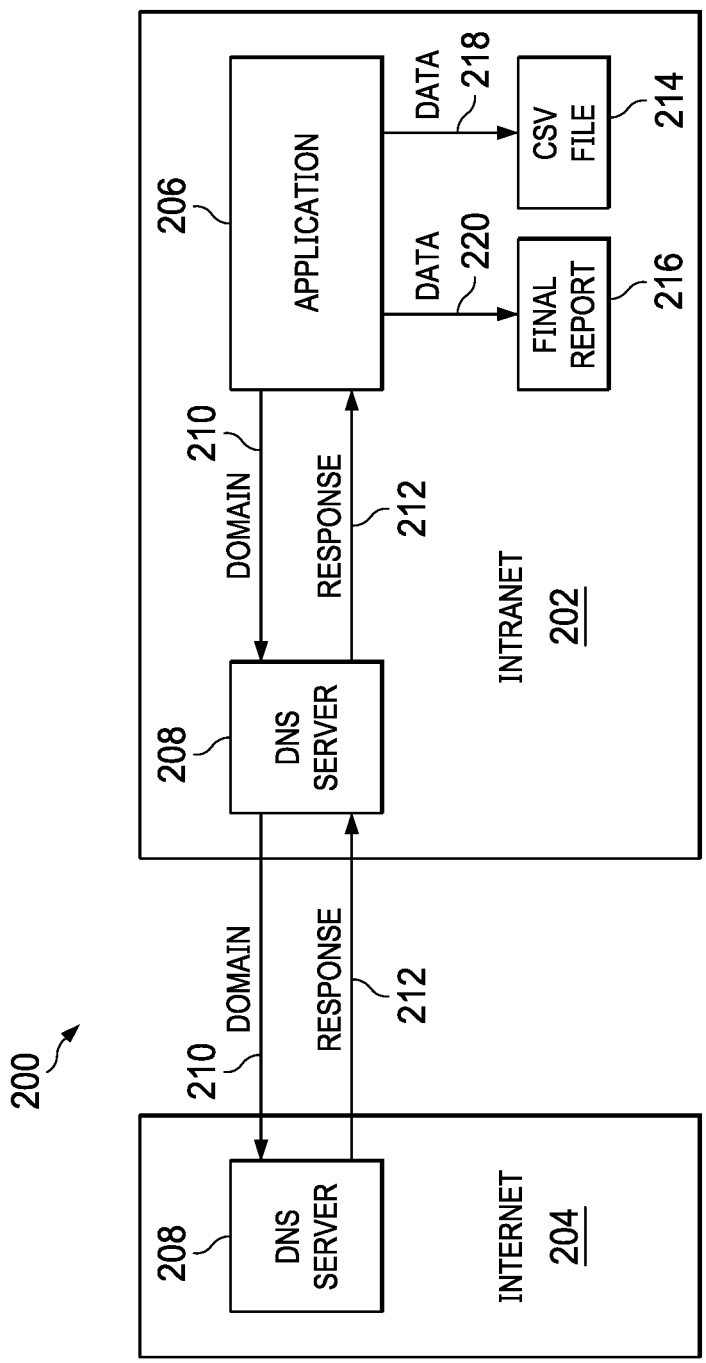
FIG. 2 is a block diagram showing an example of a system for validating SPF configurations, according to some implementations of the present disclosure.

FIG. 2 is a block diagram showing an example of a system 200 for validating SPF configurations, according to some implementations of the present disclosure. The system 200 can perform steps of the workflow 100, for example.

The system 200 includes at least one intranet 202 and at least one internet 204. The intranet 202 includes at least one application 206, for example, the application 102. The intranet 202 and the extranet 204 each include a DNS server 208, for example, the DNS server 108. DNS servers 208 can communicate with each other, for example, forwarding and handling domain requests 210 and responses 212. The application 206 can access (using data 218, including requests and responses) from a CSV file 214, for example the domain CSV file 104. The application 206 can send data 220 to a final report 216, for example the final result 106.

In some implementations, information from the final report 216 can be presented in a graphical user interface (GUI) that is presented to a user, such as an administrator (admin) of security or email communication. The GUI can include lists of invalid domains and the reason(s) why the domains are invalid. In some implementations, the user can use controls to perform operations associated with invalid domains, such as to contact the owners of the domains regarding the reason(s) for the invalid domains. Statistics can be provided with each invalid (and valid) domain, such as a number and identification of email messages that were stopped (or allowed). In some implementations, the user can provide information to engineers that facilitate updates to the application 206 to change how domains are identified as either valid or invalid.

Multiple tests were conducted and evaluated in the development of the techniques of the present disclosure. For example, the multiple tests facilitated the structure and the order of the steps in the workflow 100. The results were also used to facilitate the development of the techniques of the present disclosure to increase the efficiency and accuracy of various techniques. The results also facilitated the identification of characteristics that constitute a suitable SPF configuration.

Figure 3:
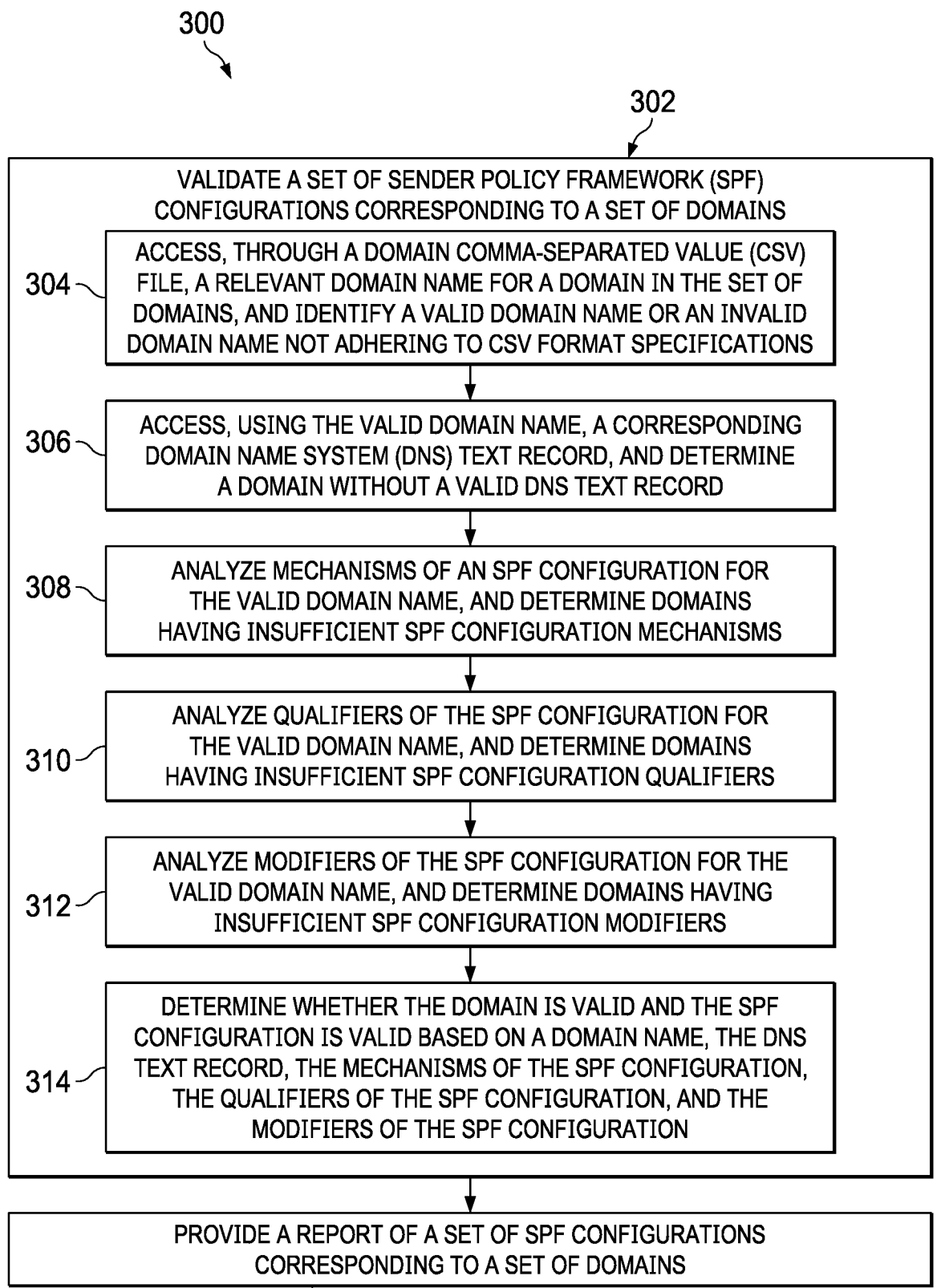
FIG. 3 is a flowchart of an example of a method for validating SPF configurations, according to some implementations of the present disclosure.

FIG. 3 is a flowchart of an example of a method 300 for validating SPF configurations, according to some implementations of the present disclosure. For clarity of presentation, the description that follows generally describes method 300 in the context of the other figures in this description. However, it will be understood that method 300 can be performed, for example, by any suitable system, environment, software, and hardware, or a combination of systems, environments, software, and hardware, as appropriate. In some implementations, various steps of method 300 can be run in parallel, in combination, in loops, or in any order.

At 302, a set of SPF configurations corresponding to a set of domains are validated. For example, validation can include steps 304-314. Examples for the steps of method 300 are provided in the description of FIGS. 1 and 2.

At 304, a relevant domain name for a domain in the set of domains is accessed through a domain CSV file. A valid domain name is identified, or an invalid domain name not adhering to CSV format specifications is identified. From 304, method 300 proceeds to 306.

At 306, a corresponding DNS text record is accessed using the valid domain name, and any domains without a valid DNS text record are determined. From 306, method 300 proceeds to 308.

At 308, mechanisms of an SPF configuration for the valid domain name are analyzed, and domains having insufficient SPF configuration mechanisms are determined. From 308, method 300 proceeds to 310.

At 310, qualifiers of the SPF configuration for the valid domain name are analyzed, and domains having insufficient SPF configuration qualifiers are determined. From 310, method 300 proceeds to 312.

At 312, modifiers of the SPF configuration for the valid domain name are analyzed, and domains having insufficient SPF configuration modifiers are determined. From 312, method 300 proceeds to 314.

At 314, a determination is made whether the domain is valid and the SPF configuration is valid based on a domain name, the DNS text record, the mechanisms of the SPF configuration, the qualifiers of the SPF configuration, and the modifiers of the SPF configuration. From 314, method 300 proceeds to 316.

At 316, a report of a set of SPF configurations corresponding to a set of domains is provided. For example, lists of valid domains can be provided in a GUI. Lists of invalid domains can also be provided with reasons for the domains being invalid. After 316, method 300 can stop.

Figure 4:
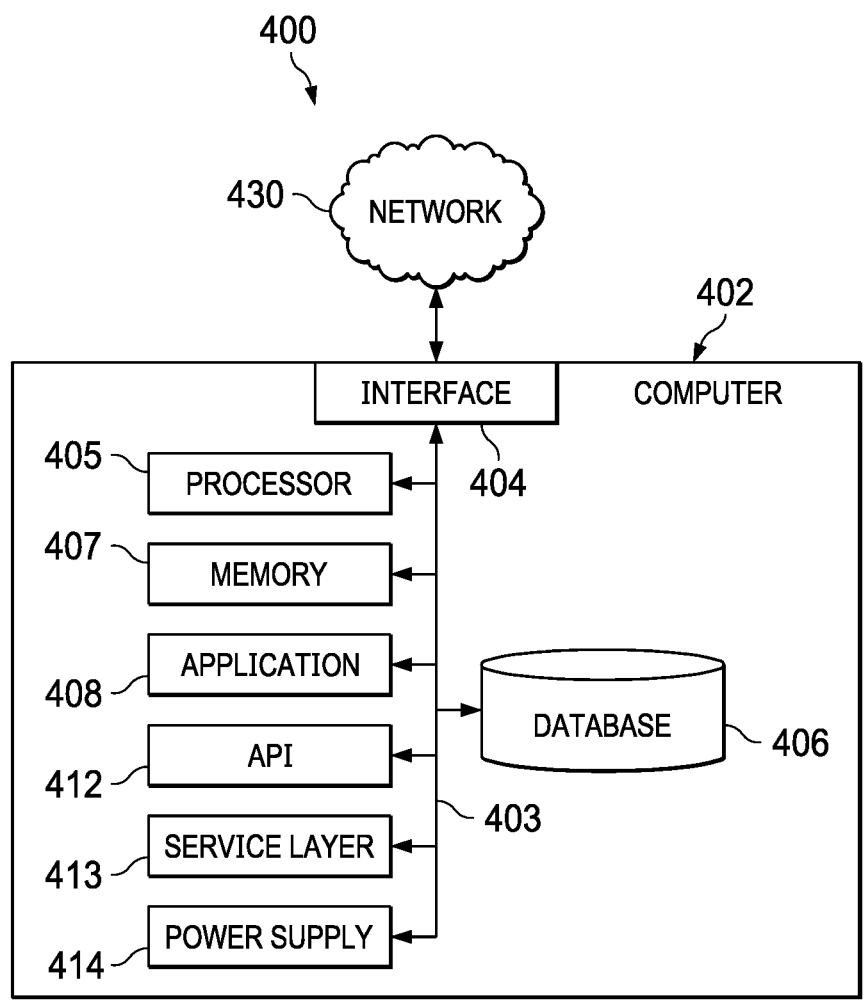
FIG. 4 is a block diagram illustrating an example computer system used to provide computational functionalities associated with described algorithms, methods, functions, processes, flows, and procedures as described in the present disclosure, according to some implementations of the present disclosure.

FIG. 4 is a block diagram of an example computer system 400 used to provide computational functionalities associated with described algorithms, methods, functions, processes, flows, and procedures described in the present disclosure, according to some implementations of the present disclosure. The illustrated computer 402 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 402 can include input devices such as keypads, keyboards, and touch screens that can accept user information. Also, the computer 402 can include output devices that can convey information associated with the operation of the computer 402. The information can include digital data, visual data, audio information, or a combination of information. The information can be presented in a graphical user interface (UI) (or GUI).

The computer 402 can serve in a role as a client, a network component, a server, a database, a persistency, or components of a computer system for performing the subject matter described in the present disclosure. The illustrated computer 402 is communicably coupled with a network 430. In some implementations, one or more components of the computer 402 can be configured to operate within different environments, including cloud-computing-based environments, local environments, global environments, and combinations of environments.

At a top level, the computer 402 is an electronic computing device operable to receive, transmit, process, store, and manage data and information associated with the described subject matter. According to some implementations, the computer 402 can also include, or be communicably coupled with, an application server, an email server, a web server, a caching server, a streaming data server, or a combination of servers.

The computer 402 can receive requests over network 430 from a client application (for example, executing on another computer 402). The computer 402 can respond to the received requests by processing the received requests using software applications. Requests can also be sent to the computer 402 from internal users (for example, from a command console), external (or third) parties, automated applications, entities, individuals, systems, and computers.

Each of the components of the computer 402 can communicate using a system bus 403. In some implementations, any or all of the components of the computer 402, including hardware or software components, can interface with each other or the interface 404 (or a combination of both) over the system bus 403. Interfaces can use an application programming interface (API) 412, a service layer 413, or a combination of the API 412 and service layer 413. The API 412 can include specifications for routines, data structures, and object classes. The API 412 can be either computer-language independent or dependent. The API 412 can refer to a complete interface, a single function, or a set of APIs.

The service layer 413 can provide software services to the computer 402 and other components (whether illustrated or not) that are communicably coupled to the computer 402. The functionality of the computer 402 can be accessible for all service consumers using this service layer. Software services, such as those provided by the service layer 413, can provide reusable, defined functionalities through a defined interface. For example, the interface can be software written in JAVA, C++, or a language providing data in extensible markup language (XML) format. While illustrated as an integrated component of the computer 402, in alternative implementations, the API 412 or the service layer 413 can be stand-alone components in relation to other components of the computer 402 and other components communicably coupled to the computer 402. Moreover, any or all parts of the API 412 or the service layer 413 can be implemented as child or sub-modules of another software module, enterprise application, or hardware module without departing from the scope of the present disclosure.

The computer 402 includes an interface 404. Although illustrated as a single interface 404 in FIG. 4, two or more interfaces 404 can be used according to particular needs, desires, or particular implementations of the computer 402 and the described functionality. The interface 404 can be used by the computer 402 for communicating with other systems that are connected to the network 430 (whether illustrated or not) in a distributed environment. Generally, the interface 404 can include, or be implemented using, logic encoded in software or hardware (or a combination of software and hardware) operable to communicate with the network 430. More specifically, the interface 404 can include software supporting one or more communication protocols associated with communications. As such, the network 430 or the interface's hardware can be operable to communicate physical signals within and outside of the illustrated computer 402.

The computer 402 includes a processor 405. Although illustrated as a single processor 405 in FIG. 4, two or more processors 405 can be used according to particular needs, desires, or particular implementations of the computer 402 and the described functionality. Generally, the processor 405 can execute instructions and can manipulate data to perform the operations of the computer 402, including operations using algorithms, methods, functions, processes, flows, and procedures as described in the present disclosure.

The computer 402 also includes a database 406 that can hold data for the computer 402 and other components connected to the network 430 (whether illustrated or not). For example, database 406 can be an in-memory, conventional, or a database storing data consistent with the present disclosure. In some implementations, database 406 can be a combination of two or more different database types (for example, hybrid in-memory and conventional databases) according to particular needs, desires, or particular implementations of the computer 402 and the described functionality. Although illustrated as a single database 406 in FIG. 4, two or more databases (of the same, different, or combination of types) can be used according to particular needs, desires, or particular implementations of the computer 402 and the described functionality. While database 406 is illustrated as an internal component of the computer 402, in alternative implementations, database 406 can be external to the computer 402.

The computer 402 also includes a memory 407 that can hold data for the computer 402 or a combination of components connected to the network 430 (whether illustrated or not). Memory 407 can store any data consistent with the present disclosure. In some implementations, memory 407 can be a combination of two or more different types of memory (for example, a combination of semiconductor and magnetic storage) according to particular needs, desires, or particular implementations of the computer 402 and the described functionality. Although illustrated as a single memory 407 in FIG. 4, two or more memories 407 (of the same, different, or combination of types) can be used according to particular needs, desires, or particular implementations of the computer 402 and the described functionality. While memory 407 is illustrated as an internal component of the computer 402, in alternative implementations, memory 407 can be external to the computer 402.

The application 408 can be an algorithmic software engine providing functionality according to particular needs, desires, or particular implementations of the computer 402 and the described functionality. For example, application 408 can serve as one or more components, modules, or applications. Further, although illustrated as a single application 408, the application 408 can be implemented as multiple applications 408 on the computer 402. In addition, although illustrated as internal to the computer 402, in alternative implementations, the application 408 can be external to the computer 402.

The computer 402 can also include a power supply 414. The power supply 414 can include a rechargeable or non-rechargeable battery that can be configured to be either user- or non-user-replaceable. In some implementations, the power supply 414 can include power-conversion and management circuits, including recharging, standby, and power management functionalities. In some implementations, the power-supply 414 can include a power plug to allow the computer 402 to be plugged into a wall socket or a power source to, for example, power the computer 402 or recharge a rechargeable battery.

There can be any number of computers 402 associated with, or external to, a computer system containing computer 402, with each computer 402 communicating over network 430. Further, the terms "client," "user," and other appropriate terminology can be used interchangeably, as appropriate, without departing from the scope of the present disclosure. Moreover, the present disclosure contemplates that many users can use one computer 402 and one user can use multiple computers 402.

Described implementations of the subject matter can include one or more features, alone or in combination.

For example, in a first implementation, a computer-implemented method includes the following. A set of Sender Policy Framework (SPF) configurations corresponding to a set of domains are validated. A relevant domain name for a domain in the set of domains is accessed through a domain comma-separated value (CSV) file. A valid domain name is identified, or an invalid domain name not adhering to CSV format specifications is identified. A corresponding domain name system (DNS) text record is accessed using the valid domain name, and any domains without a valid DNS text record are determined. Mechanisms of an SPF configuration for the valid domain name are analyzed, and domains having insufficient SPF configuration mechanisms are determined. Qualifiers of the SPF configuration for the valid domain name are analyzed, and domains having insufficient SPF configuration qualifiers are determined. Modifiers of the SPF configuration for the valid domain name are analyzed, and domains having insufficient SPF configuration modifiers are determined. A determination is made whether the domain is valid and the SPF configuration is valid based on a domain name, the DNS text record, the mechanisms of the SPF configuration, the qualifiers of the SPF configuration, and the modifiers of the SPF configuration. A report of a set of Sender Policy Framework (SPF) configurations corresponding to a set of domains is provided.

The foregoing and other described implementations can each, optionally, include one or more of the following features:

A first feature, combinable with any of the following features, where the domain name is a unique name used to differentiate a computer or a group of computers on the Internet.

A second feature, combinable with any of the previous or following features, where the text record is a type of resource record in the DNS that is systematically used to provide the ability to associate arbitrary text with a host name.

A third feature, combinable with any of the previous or following features, where the host name is a first portion of a Fully Qualified Domain Name (FQDN).

A fourth feature, combinable with any of the previous or following features, where the arbitrary text includes human readable information about a server, network, data center, and accounting information.

A fifth feature, combinable with any of the previous or following features, where the mechanisms include SPF records identifying servers permitted to send mail on behalf of the domain.

A sixth feature, combinable with any of the previous or following features, where the qualifiers describe an action to take when a sending Internet Protocol (IP) matches a qualifier.

In a second implementation, a non-transitory, computer-readable medium stores one or more instructions executable by a computer system to perform operations including the following. A set of Sender Policy Framework (SPF) configurations corresponding to a set of domains are validated. A relevant domain name for a domain in the set of domains is accessed through a domain comma-separated value (CSV) file. A valid domain name is identified, or an invalid domain name not adhering to CSV format specifications is identified. A corresponding domain name system (DNS) text record is accessed using the valid domain name, and any domains without a valid DNS text record are determined. Mechanisms of an SPF configuration for the valid domain name are analyzed, and domains having insufficient SPF configuration mechanisms are determined. Qualifiers of the SPF configuration for the valid domain name are analyzed, and domains having insufficient SPF configuration qualifiers are determined. Modifiers of the SPF configuration for the valid domain name are analyzed, and domains having insufficient SPF configuration modifiers are determined. A determination is made whether the domain is valid and the SPF configuration is valid based on a domain name, the DNS text record, the mechanisms of the SPF configuration, the qualifiers of the SPF configuration, and the modifiers of the SPF configuration. A report of a set of Sender Policy Framework (SPF) configurations corresponding to a set of domains is provided.

The foregoing and other described implementations can each, optionally, include one or more of the following features:

A first feature, combinable with any of the following features, where the domain name is a unique name used to differentiate a computer or a group of computers on the Internet.

A second feature, combinable with any of the previous or following features, where the text record is a type of resource record in the DNS that is systematically used to provide the ability to associate arbitrary text with a host name.

A third feature, combinable with any of the previous or following features, where the host name is a first portion of a Fully Qualified Domain Name (FQDN).

A fourth feature, combinable with any of the previous or following features, where the arbitrary text includes human readable information about a server, network, data center, and accounting information.

A fifth feature, combinable with any of the previous or following features, where the mechanisms include SPF records identifying servers permitted to send mail on behalf of the domain.

A sixth feature, combinable with any of the previous or following features, where the qualifiers describe an action to take when a sending Internet Protocol (IP) matches a qualifier.

In a third implementation, a computer-implemented system includes one or more processors and a non-transitory computer-readable storage medium coupled to the one or more processors and storing programming instructions for execution by the one or more processors. The programming instructions instruct the one or more processors to perform operations including the following. A set of Sender Policy Framework (SPF) configurations corresponding to a set of domains are validated. A relevant domain name for a domain in the set of domains is accessed through a domain comma-separated value (CSV) file. A valid domain name is identified, or an invalid domain name not adhering to CSV format specifications is identified. A corresponding domain name system (DNS) text record is accessed using the valid domain name, and any domains without a valid DNS text record are determined. Mechanisms of an SPF configuration for the valid domain name are analyzed, and domains having insufficient SPF configuration mechanisms are determined. Qualifiers of the SPF configuration for the valid domain name are analyzed, and domains having insufficient SPF configuration qualifiers are determined. Modifiers of the SPF configuration for the valid domain name are analyzed, and domains having insufficient SPF configuration modifiers are determined. A determination is made whether the domain is valid and the SPF configuration is valid based on a domain name, the DNS text record, the mechanisms of the SPF configuration, the qualifiers of the SPF configuration, and the modifiers of the SPF configuration. A report of a set of Sender Policy Framework (SPF) configurations corresponding to a set of domains is provided.

The foregoing and other described implementations can each, optionally, include one or more of the following features:

A first feature, combinable with any of the following features, where the domain name is a unique name used to differentiate a computer or a group of computers on the Internet.

A second feature, combinable with any of the previous or following features, where the text record is a type of resource record in the DNS that is systematically used to provide the ability to associate arbitrary text with a host name.

A third feature, combinable with any of the previous or following features, where the host name is a first portion of a Fully Qualified Domain Name (FQDN).

A fourth feature, combinable with any of the previous or following features, where the arbitrary text includes human readable information about a server, network, data center, and accounting information.

A fifth feature, combinable with any of the previous or following features, where the mechanisms include SPF records identifying servers permitted to send mail on behalf of the domain.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatuses, devices, and machines for processing data, including by way of example, a programmable processor, a computer, or multiple processors or computers. The apparatus can also include special purpose logic circuitry including, for example, a central processing unit (CPU), a field-programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, such as LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory.

Graphics processing units (GPUs) can also be used in combination with CPUs. The GPUs can provide specialized processing that occurs in parallel to processing performed by CPUs. The specialized processing can include artificial intelligence (AI) applications and processing, for example. GPUs can be used in GPU clusters or in multi-GPU computing.

A computer can include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/−R, DVD-RAM, DVD-ROM, HD-DVD, and BLU-RAY.

The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated into, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that the user uses. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch-screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations. It should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

What is claimed is:

1. A computer-implemented method, comprising:
   validating a set of Sender Policy Framework (SPF) configurations corresponding to a set of domains, including validating each SPF configuration in the set for validity and being configured to allow permissible messages, including, for each domain:
   accessing, through a domain comma-separated value (CSV) file, a relevant domain name for a domain in the set of domains, and identifying a valid domain name or an invalid domain name not adhering to CSV format specifications;
   accessing, using the valid domain name, a corresponding domain name system (DNS) text record, and determining a domain without a valid DNS text record;
   analyzing mechanisms of an SPF configuration for the valid domain name, and determining domains having insufficient SPF configuration mechanisms;
   analyzing qualifiers of the SPF configuration for the valid domain name, and determining domains having insufficient SPF configuration qualifiers;
   analyzing modifiers of the SPF configuration for the valid domain name, and determining domains having insufficient SPF configuration modifiers for providing security to email servers; and
   determining whether the domain is valid and the SPF configuration is valid based on a domain name, the DNS text record, the mechanisms of the SPF configuration, the qualifiers of the SPF configuration, and the modifiers of the SPF configuration; and
   providing a report of a set of SPF configurations corresponding to a set of domains, including providing information for safely implementing SPF mechanisms on the email servers.

2. The computer-implemented method of claim 1, wherein the domain name is a unique name used to differentiate a computer or a group of computers on the Internet.

3. The computer-implemented method of claim 1, wherein the text record is a type of resource record in the DNS that is systematically used to provide the ability to associate arbitrary text with a host name.

4. The computer-implemented method of claim 3, wherein the host name is a first portion of a Fully Qualified Domain Name (FQDN).

5. The computer-implemented method of claim 3, wherein the arbitrary text includes human readable information about a server, network, data center, and accounting information.

6. The computer-implemented method of claim 1, wherein the mechanisms include SPF records identifying servers permitted to send mail on behalf of the domain.

7. The computer-implemented method of claim 1, wherein the qualifiers describe an action to take when a sending Internet Protocol (IP) matches a qualifier.

8. A non-transitory, computer-readable medium storing one or more instructions executable by a computer system to perform operations comprising:
   validating a set of Sender Policy Framework (SPF) configurations corresponding to a set of domains, including validating each SPF configuration in the set for validity and being configured to allow permissible messages, including, for each domain:
   accessing, through a domain comma-separated value (CSV) file, a relevant domain name for a domain in the set of domains, and identifying a valid domain name or an invalid domain name not adhering to CSV format specifications;
   accessing, using the valid domain name, a corresponding domain name system (DNS) text record, and determining a domain without a valid DNS text record;
   analyzing mechanisms of an SPF configuration for the valid domain name, and determining domains having insufficient SPF configuration mechanisms;
   analyzing qualifiers of the SPF configuration for the valid domain name, and determining domains having insufficient SPF configuration qualifiers;

analyzing modifiers of the SPF configuration for the valid domain name, and determining domains having insufficient SPF configuration modifiers for providing security to email servers; and determining whether the domain is valid and the SPF configuration is valid based on a domain name, the DNS text record, the mechanisms of the SPF configuration, the qualifiers of the SPF configuration, and the modifiers of the SPF configuration; and providing a report of a set of SPF configurations corresponding to a set of domains including providing information for safely implementing SPF mechanisms on the email servers.

9. The non-transitory, computer-readable medium of claim 8, wherein the domain name is a unique name used to differentiate a computer or a group of computers on the Internet.

10. The non-transitory, computer-readable medium of claim 8, wherein the text record is a type of resource record in the DNS that is systematically used to provide the ability to associate arbitrary text with a host name.

11. The non-transitory, computer-readable medium of claim 10, wherein the host name is a first portion of a Fully Qualified Domain Name (FQDN).

12. The non-transitory, computer-readable medium of claim 10, wherein the arbitrary text includes human readable information about a server, network, data center, and accounting information.

13. The non-transitory, computer-readable medium of claim 8, wherein the mechanisms include SPF records identifying servers permitted to send mail on behalf of the domain.

14. The non-transitory, computer-readable medium of claim 8, wherein the qualifiers describe an action to take when a sending Internet Protocol (IP) matches a qualifier.

15. A computer-implemented system, comprising:
one or more processors; and
a non-transitory computer-readable storage medium coupled to the one or more processors and storing programming instructions for execution by the one or more processors, the programming instructions instructing the one or more processors to perform operations comprising:
validating a set of Sender Policy Framework (SPF) configurations corresponding to a set of domains, including validating each SPF configuration in the set for validity and being configured to allow permissible messages, including, for each domain:

accessing, through a domain comma-separated value (CSV) file, a relevant domain name for a domain in the set of domains, and identifying a valid domain name or an invalid domain name not adhering to CSV format specifications;

accessing, using the valid domain name, a corresponding domain name system (DNS) text record, and determining a domain without a valid DNS text record;

analyzing mechanisms of an SPF configuration for the valid domain name, and determining domains having insufficient SPF configuration mechanisms;

analyzing qualifiers of the SPF configuration for the valid domain name, and determining domains having insufficient SPF configuration qualifiers;

analyzing modifiers of the SPF configuration for the valid domain name, and determining domains having insufficient SPF configuration modifiers for providing security to email servers; and determining whether the domain is valid and the SPF configuration is valid based on a domain name, the DNS text record, the mechanisms of the SPF configuration, the qualifiers of the SPF configuration, and the modifiers of the SPF configuration; and providing a report of a set of SPF configurations corresponding to a set of domains, including providing information for safely implementing SPF mechanisms on the email servers.

16. The computer-implemented system of claim 15, wherein the domain name is a unique name used to differentiate a computer or a group of computers on the Internet.

17. The computer-implemented system of claim 15, wherein the text record is a type of resource record in the DNS that is systematically used to provide the ability to associate arbitrary text with a host name.

18. The computer-implemented system of claim 17, wherein the host name is a first portion of a Fully Qualified Domain Name (FQDN).

19. The computer-implemented system of claim 17, wherein the arbitrary text includes human readable information about a server, network, data center, and accounting information.

20. The computer-implemented system of claim 15, wherein the mechanisms include SPF records identifying servers permitted to send mail on behalf of the domain.

* * * * *

UNITED STATES PATENT AND TRADEMARK OFFICE
CERTIFICATE OF CORRECTION

PATENT NO. : 11,277,375 B1
APPLICATION NO. : 17/140231
DATED : March 15, 2022
INVENTOR(S) : Gilliam Page 1 of 1

It is certified that error appears in the above-identified patent and that said Letters Patent is hereby corrected as shown below:

In the Claims

Column 15, Line 11, Claim 8, delete "domains" and insert -- domains, --.

Signed and Sealed this
Twenty-sixth Day of July, 2022

Katherine Kelly Vidal
*Director of the United States Patent and Trademark Office*